United States Patent

[11] 3,622,722

[72] Inventors: Earl L. Jackson, San Francisco; Werner Sepper, Concord, both of Calif.
[21] Appl. No.: 30,198
[22] Filed: Apr. 20, 1970
[45] Patented: Nov. 23, 1971
[73] Assignee: Life Technology, Inc., Concord, Calif.

[54] STEERING MEMBER REVERSAL SWITCH
9 Claims, 7 Drawing Figs.

[52] U.S. Cl. ................................. 200/61.39, 340/279
[51] Int. Cl. ................................. H01h 3/16
[50] Field of Search ................................. 200/61.39, 61.54; 335/205, 206, 207; 74/798; 340/271, 54, 279, 52 R, 279, 53; 324/78 R

[56] References Cited

UNITED STATES PATENTS

| | | | |
|---|---|---|---|
| 2,782,902 | 2/1957 | Sloane | 200/61.39 X |
| 3,402,343 | 9/1968 | Brown et al. | 324/0.5 G |
| 3,559,205 | 1/1971 | Colby | 340/279 |
| 3,456,188 | 7/1969 | Greenshields | 324/78 |
| 3,426,303 | 2/1969 | Buckner | 200/61.39 X |
| 1,986,177 | 1/1935 | Zastoupil | 74/798 |

Primary Examiner—H. O. Jones
Assistant Examiner—M. Ginsburg
Attorney—Limbach, Limback & Sutton ABSTRACT: A rim-driven wheel engages a rotatable vehicle steering member. Motion is amplified by a planetary bearing assembly and applied to a lever arm through a clutch assembly. The free end of the arm carries a magnet that actuates magnetically actuated reed switches that are located adjacent to arm stops. Clockwise rotation of the steering member results in closure of one-reed switch; counterclockwise rotation results in closure of the other reed switch.

INVENTORS
EARL L. JACKSON
WERNER SEPPER
BY
Limbach, Limbach & Sutton
ATTORNEYS

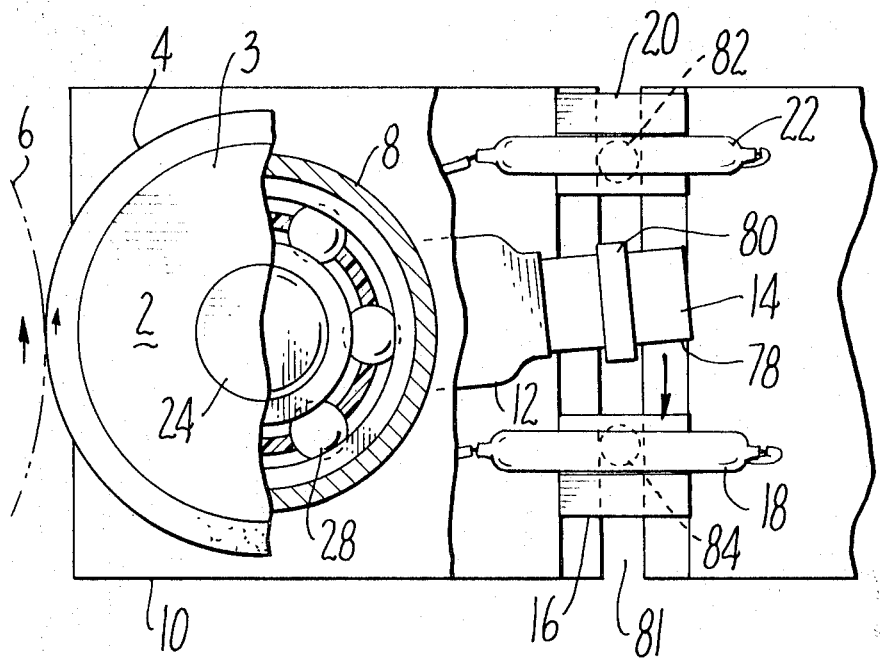
FIG. 3.
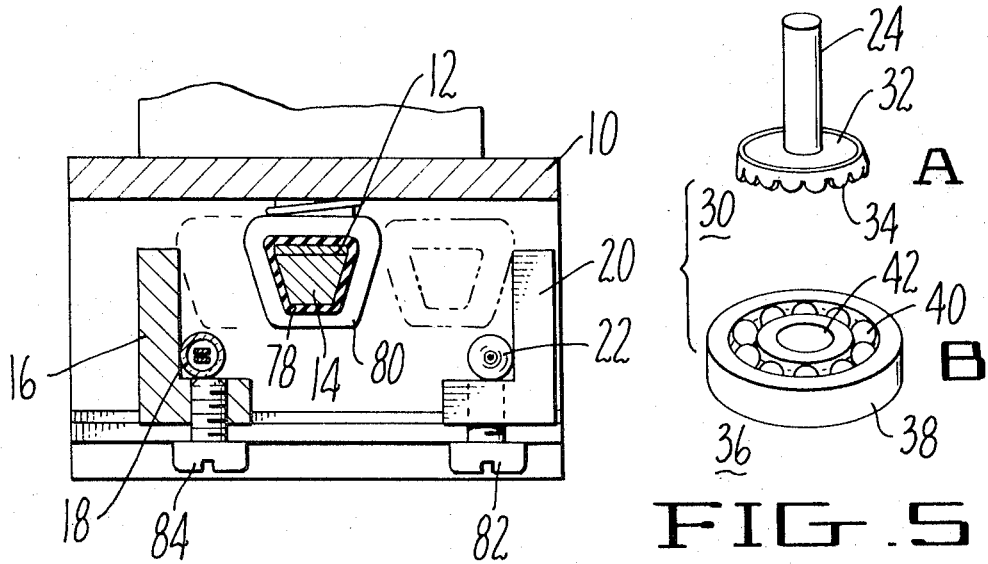
FIG. 4.
FIG. 5.
INVENTORS
EARL L. JACKSON
WERNER SEPPER
BY
Limbach, Limbach & Sutton
ATTORNEYS

STEERING MEMBER REVERSAL SWITCH

BACKGROUND OF THE INVENTION

This invention relates generally to vehicle safety devices and more particularly to steering member reversal switch for use with driver alertness indicators or aids.

Research in driver characteristics has shown that a useful indicator of driver attentiveness is the rate of steering wheel reversals. A reversal is a change or rotation from clockwise to counterclockwise or vice versa and is the result of a volitional, but not necessarily conscious, muscular movement by the driver to control the tracking of the vehicle. It has been found that a given driver tends to maintain a fairly constant steering wheel reversal rate. In the event of adverse traffic or highway conditions, the driver tends to adjust the vehicle speed in order to achieve a comfortable reversal rate. If the vehicle operator is driving too fast for road conditions, is engaged in conversations with passengers or is following another vehicle too closely thereby tracking an object close to the front of his car instead of tracking a long distance down the road, his reversal rate will tend to be higher than his normal rate. On the other hand if the vehicle operator becomes sleepy, hypnotized by the road conditions, or intoxicated, the reversal rate will tend to drop below his normal rate. Indeed, it has been found that the decrease in reversal rate is a precursor of the above-mentioned conditions and correlates with physiological changes taking place in the driver.

In U.S. Pat. No. 3,227,998 issued to Fletcher N. Platt on Jan. 4, 1966, an automobile driver attention indicator is disclosed wherein electrical pulses of constant width are generated in response to the steering wheel reversals and are used to charge a capacitor. The capacitor voltage is monitored to provide an indication of the reversal rate. In order to be adapted to the normal reversal rate of each individual driver, a voltage divider across the capacitor must be manually adjusted. A single warning device having manually adjusted high and low thresholds then monitors the voltage divider output. In order to calibrate the voltage divider to the individuals normal reversal rate, a meter must be observed by the driver for several minutes and a control must be adjusted to center the meter reading. In order for the unit to be effective, the calibration should be performed at the beginning of each trip when the driver is most alert.

An improvement on said Platt patent is disclosed and claimed in a copending application of Werner Sepper, Ser. No. 27,410, filed Apr. 10, 1970, assigned to the assignee of this invention and entitled "Automatic Driver Alertness Aid." In that application, pulses, generated by every reversal of vehicle's steering wheel are automatically counted during a fixed time period to determine a reversal rate when the vehicle exceeds a minimum speed. That rate is stored and a voltage proportional to the rate is used to control the pulse width of subsequent reversal pulses that are applied to a capacitor charging circuit having a long time constant. A high-capacitor voltage activates a high-reversal rate alarm and a low-capacitor voltage activates a low-reversal rate alarm.

In both the Platt patent and the Sepper application, it is necessary to somehow actuate a circuit path upon a steering member reversal. It has been found that a reversal sensitivity in the order of 1½° to 4° is sufficient to provide proper operation of the alertness apparatus. However, the design of an effective long-lasting device to signal steering member reversals has been a problem.

In the aforementioned Platt patent, a ring rides on the steering member. A pivoted finger with a felt tip engages the ring and closes a switch when the steering member is rotated clockwise; the switch opens when the rotation is counterclockwise. This arrangement has obvious drawbacks including the wear on the felt tip. In addition, the sensitivity of the switch is not adjustable; for example, a slight rotation or jiggling could activate a series of false pulses.

In U.S. Pat. No. 3,456,188 issued to Bruce D. Greenshields on July 15, 1969, another type of reversal switch is described: an actuator is slidably fit on a drive shaft engaging the steering member. The actuator is allowed to rotate between two-fixed shoulders and is spring connected to a pivoted arm acting as a light shutter that can rotate between two stops. A path between a lamp and sensor are interrupted by the pivoted arm to generate reversal pulses. This arrangement has the disadvantage of lamp replacement and also is not adjustable as to angle sensitivity. Moreover, neither Greenshields nor Platt provide any significant amplification of the steering member movement.

SUMMARY OF THE INVENTION

In order to overcome some of the disadvantages of the prior art, a stable adjustable reversal switch is provided employing generally a drive wheel connected to a planetary amplifier that drives an arm through a clutch. The arm has a magnet on its end and is rotatable between adjustable stops having magnetically actuated reed switches. By adjusting the stops, a movement of about 1° to 4° may be detected and different steering column diameters may be compensated for. The clutch permits reversals to be sensed even when long sweeping turns are being made by the vehicle. Use of reed switches provide a positive indicator and virtually eliminates false reversal signals.

The ratio of the drive wheel to steering member diameters provides an initial amplification. This movement is amplified by a pair of drive-bearing assemblies and is applied to a clutch assembly that drives the magnet carrying arm. The lever arm provides additional amplification to provide an actual amplification of about 40 to one in a working model. The exact amplification is variable by adjusting the location of the stops.

BRIEF DESCRIPTION OF THE DRAWINGS

FIG. 3 is a cross-sectional plan view through lines 3—3 of FIG. 2.

FIG. 4 is a cross-sectional end elevation view through lines 4—4 of FIG. 2.

FIG. 5A is a perspective view of a driver forming a part of the amplifier assembly of the reversal switch.

FIG. 5B is a perspective view of a drive assembly forming a part of the amplifier assembly of the reversal switch.

DESCRIPTION OF THE PREFERRED EMBODIMENTS

Figures 1, 2:
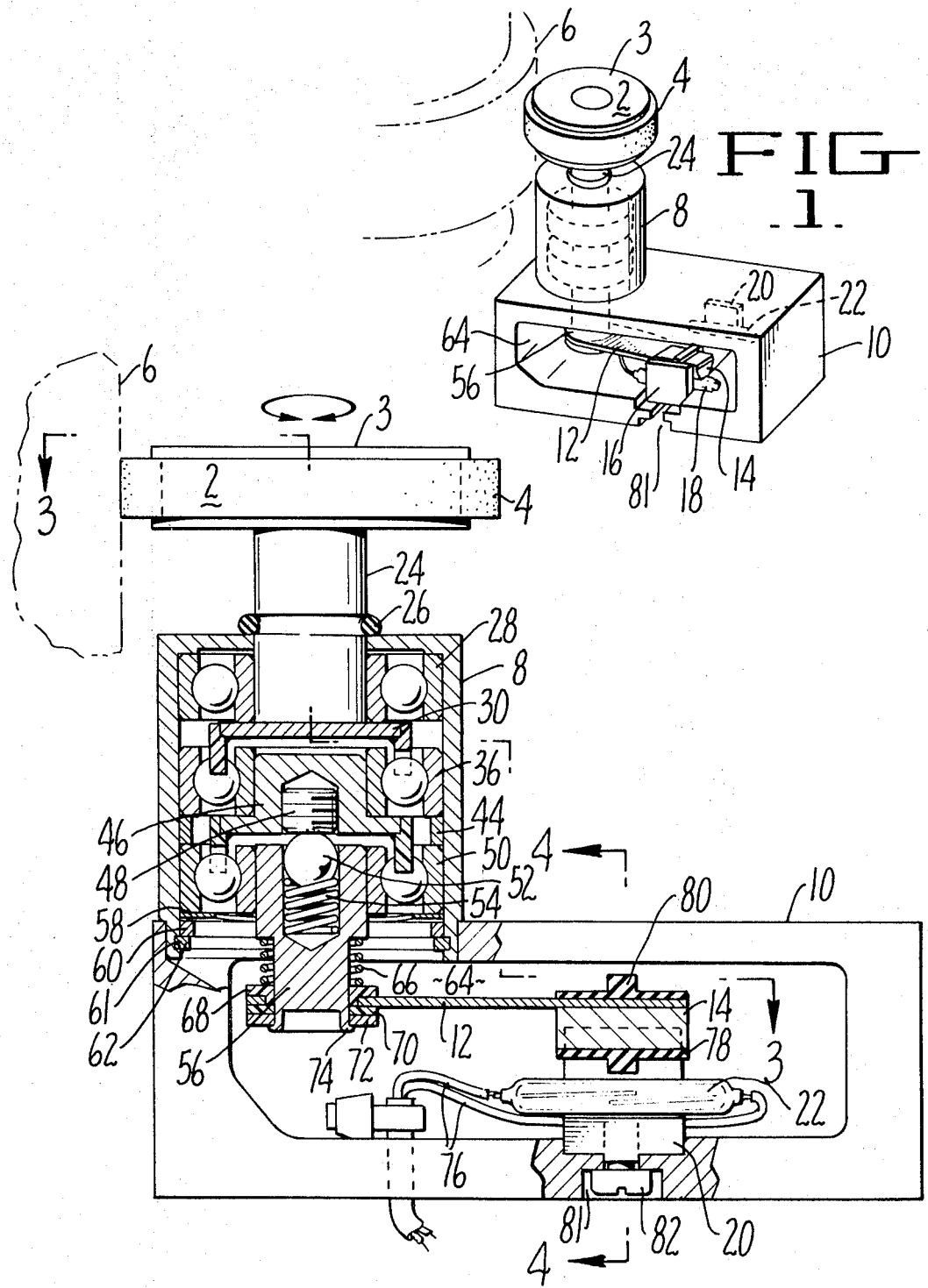
FIG. 1 is a perspective view of an embodiment of the reversal switch according to the present invention.
FIG. 2 is a cross-sectional side elevation view of an embodiment of the reversal switch according to the invention.

FIG. 1 is a perspective view of the reversal switch according to an embodiment of the present invention. The same reference numerals will be carried through the various figures to denote the same elements. A drive wheel subassembly is shown engaging the movable portion of a vehicle steering column 6. The drive wheel subassembly includes a toroidal disc 3 having a rubber rim 4 around its periphery. Rim 4 assures a good frictional contact with steering column 6. A central shaft 24 passes through disc 3 and rotates therewith. Shaft 24 passes through a hollow cylinder 8 housing a planetary amplifier arrangement described hereinafter. A shaft 56 transmits amplified rotational motion from shaft 24 to a lever arm 12 located within a hollow rectangular shape housing 10. For ease in description, the sides of housing 10 are shown open. Arm 12 is an elongated flat rectangular metal piece having a magnet 14 mounted at the end farthest from shaft 56. Arm 12 is mounted to shaft 56 through a clutch assembly 64 that is described in detail hereinafter. Arm 12 may rotate clockwise (as viewed from the top of the unit) until it strikes an L-shaped bracket or stop 16. A magnetically actuated reed switch 18 is mounted on bracket 16 so that magnet 14 will pass above it. Bracket 16 is adjustable to any position along a channel 81. A second bracket 20 and reed switch (shown in phantom) are located at the opposite end of channel 81. Thus, as steering assembly 6 rotates, drive wheel subassembly 2 rotates. The degree of rotation is amplified in column 8 and is transmitted by shaft 56 and clutch 64 to arm 12. If arm 12 is against a stop 16 or 20 and rotation in that direction continues, the clutch will allow slippage and the mechanism will not be damaged. The reed switch 18 or 22 beneath magnet 14 at the end of arm 12 will be closed. Upon rotation of column 6 in the opposite direction, arm 12 will move away from the stop and will strike the other stop and close its reed switch if column 6 has been rotated far enough. By adjusting the gap between the stop, the rotation required to close a reed switch may be varied. It will be seen that only a reversal of the column 6 by more than a minimum amount will cause the arm 12 to initiate closure of the opposite reed switch because no matter how far the column 6 is turned in a given direction, the clutch will operate to keep the arm 12 in place against the same stop.

Referring now to FIG. 2 wherein a side elevation view, partly in cross section, of the reversal switch is shown. Shaft 24 enters cylindrical column 8 and is fixed to a driver 30. An O-ring seal 26 at the point of entrance provides a dust seal. FIG. 5A shows the driver 30 in greater detail as including a flat metallic circular disc 32 fixed to shaft 24. Integrally fixed to the periphery of disc 32 is a circular ring of downward extending teeth 34 formed from an acetal resin material known under the trade name Delrin. It is desirable that teeth 34 be formed of a low friction yet long wearing and nonabrasive material. The teeth of driver 30 engage an input drive assembly 36 that is shown in greater detail in FIG. 5B. Assembly 36 is essentially an outer toroidal ring or race 38 separated from an inner ring or race 42 by ball bearings 40. Teeth 34 of driver 30 fit over and engage ball bearings 40. The outer race 38 is friction fitted to the interior wall of column 8, thus as the driver teeth 34 rotate, the motion is translated to the inner race causing it to rotate with some amplification. A journal bearing assembly 28 that is identical to assembly 36 is located above driver 30 to provide rigidity. The outer race of assembly 28 is also friction fitted to the interior wall of column 8 and the inner race id friction fitted to shaft 24.

A second driver 46, similar to input driver 30 has a hollow central shaft that is friction fitted to the inner race of assembly 36. A plug 48 is fitted with the hollow shaft. The teeth of driver 46 engage the ball bearings of an output driver assembly 50. Assembly 50 has its outer race friction fitted to the interior wall of column 8 and is separated from assembly 36 by a circular ring spacer 44. A shaft 56 is friction fitted to the inside race of assembly 50. Shaft 56 has an upper portion that is hollow in which a spring 54 urges a ball bearing upward against plug 48. The lower portion of shaft 56 extends downward into the cavity of housing 10 and has a smaller diameter with the assembly 64 and arm 12 mounted thereon.

The outer race of assembly 50 rests on a circular wave spring washer 58. The outer radius of washer 58 engages the inner wall of column 8 and the inner radius is large enough that the washer does not engage the inner race of assembly 50. Spring washer 58 permits a slight movement of the drive wheel assembly 2 when a force is applied axially downward. A circular ring spacer 60 is fitter directly below spring 58. A snap-in retaining ring 62 fits into a radial notch in the inner wall of column 8 just below spacer 60. Retaining ring 60 secures the bearing and drive assemblies within column 8.

Referring now to the details of clutch assembly 64. a spring 66 surrounds the lower portion of shaft 56 being held at the top by the shoulder where the diameter of shaft 56 becomes larger. The bottom portion of spring 66 urges a Delrin washer 68 downward against the end of arm 12. Washer 68 is ring shaped and is fitter around shaft 56. A portion of its periphery is notched to permit the end of arm 12 to fit over the washer thereby providing a low-friction Delrin surface between the metal arm and metal shaft 56. Viewed from its edge, washer 68 is generally T-shaped A further Delrin washer 70 in a simple ring fits around shaft 56 below washer 68 and arm 14. A metal ring washer 72 fits below washer 70 and is held on the shaft by the fluted ends 74 of shaft 56. The clutch surfaces are the interfaces of washer 72—washer 70 and shaft 56—washers 68 and 70. If arm 12 is not against either stop, there is sufficient friction at the interfaces to turn arm 12. But if the arm is against either stop and the arm is rotated against the stop, shaft 56 and washer 72 will turn freely, but arm 12 and washers 70 and 68 will remain stationary.

As viewed in FIG. 2, the right-hand portion of arm 12 has a magnet 14 fixed to the bottom thereof. The magnet and arm end is covered by a shrink tube plastic jacket 78 and a neoprene bumper ring 80 surrounds the central portion of jack 78. By adjusting the radial width of bumper 80, the magnet can be centered directly over the reed switch when the bumper contacts a stop. The left-hand reed switch 22 is shown mounted on an L-shaped assembly and stop 20. Electrical leads 76 are brought out of housing 10 for connection to an external circuit. A screw 82 permits the assembly 20 to be moved through channel 81.

A better appreciation of the adjustable assemblies 16 and 20 may 92 had by reference to FIG. 3 wherein a partly cutaway plan view of the reversal switch is shown. At the left-hand portion drive wheel assembly 2 is shown in contact with steering column 6. Shaft 24 is shown engaging journal bearing assembly 28 within column 8. Arm 12 is seen extending in housing 10 below column 8 and having magnet 14 at its end with jacket 78 and bumper 80 thereon. Referring now also to FIG. 4, the right-hand stop assembly 20 is shown near the edge of housing 10. Screw 82 fixes assembly 20 at any location along channel 81. Reed switch 22 is fixed to the stop assembly. In like manner, left-hand stop assembly including reed switch 18 is shown located along channel 81 toward the center of housing 10. A screw 84 holds assembly 16 in position. When arm 12 is in the position shown, neither reed switch will be closed, however in the right-hand phantom position, switch 22 will close due to the proximity of magnet 14. Likewise, in the left-hand phantom position, switch 18 will close.

While the switch of the present invention has been described in connection with sensing steering member movement, it is to be understood that it is in no way limited to that use except as may be provided by the claims.

Although not forming a specific part of the invention, it will be realized by those of ordinary skill in the art, that a number of ways of mounting the switch assembly and holding the drive wheel against the rotating steering member could be employed. For example, the assembly could be pivotally mounted with spring bias urging the drive wheel against the rotating steering member. With that type of mounting the drive wheel will ride on the rotating member even if the member is out of round.

We claim:
1. Switch apparatus comprising an input shaft,
means connected to said shaft for amplifying the angular rotation of said input shaft,
a lever arm having a magnet mounted at one end thereof,
clutch means for clutchingly coupling the second end of said lever arm to said amplifying means,
means to limit the coupled motion of said lever arm between a pair of predetermined limits, and
a magnetically actuated reed switch mounted within said predetermined limits for actuation by said magnet.
2. Switch apparatus according to claim 1 wherein said amplifying means comprises,
a planetary bearing assembly driven by said input shaft.
3. Apparatus according to claim 2 wherein said motion limiting means comprises an adjustably bracket.
4. Switch apparatus according to claim 3 wherein said clutch means comprises;
an output shaft coupled at a first end to said amplifying means, said shaft having an end portion of reduced diameter, defining a shoulder, the second end of said shaft being fluted,
a ring washer surrounding said output shaft and adjacent to said fluted end,
a nonmetallic ring washer surrounding said output shaft and adjacent said last recited washer, a nonmetallic T-shaped ring washer surrounding said output shaft and adjacent said nonmetallic ring washer, said T-shaped washer having two outside diameters, the smaller diameter portion holding the end of said lever arm, and a biasing spring surrounding said shaft and urging said washers away from said output shaft shoulder.

5. Apparatus according to claim 1 wherein said limiting means comprises two stops, and wherein, a second magnetically actuated reed switch is mounted within said predetermined limits, said first reed switch mounted adjacent one of said stops and said second reed switch mounted adjacent the other of said stops.

6. Switch apparatus comprising an input shaft, means connected to said shaft for amplifying the angular rotation of said input shaft whereby the angular rotation of said input shaft is increased, a lever arm having electrical contact actuating means mounted at one end thereof, clutch means having a shaft for clutchingly coupling said lever arm to said amplifying means with the end of said last mentioned shaft and the second end of said lever arm being frictionally connected, means to limit the coupled motion of said lever arm between a pair of predetermined limits, and electrical contact means mounted within said predetermined limits for actuation by said actuating means when said actuating means and said electrical contact means are adjacent.

7. Switch apparatus according to claim 6 wherein said amplifying means comprises a planetary bearing assembly driven by said input shaft.

8. Apparatus according to claim 7 wherein said motion limiting means comprises an adjustable bracket.

9. Switch apparatus according to claim 8 wherein said clutch means comprises an output shaft coupled at a first end to said amplifying means, said shaft having an end portion of reduced diameter defining a shoulder, the second end of said shaft being fluted, a ring washer surrounding said output shaft and adjacent to said fluted end, a nonmetallic ring washer surrounding said output shaft and adjacent said last recited washer, a nonmetallic T-shaped ring washer surrounding said output shaft and adjacent said nonmetallic ring washer, said T-shaped washer having two outside diameters, the smaller diameter portion holding the end of said lever arm, and a biasing spring surrounding said shaft and urging said washers away from said output shaft shoulder.

* * * * *